(12) United States Patent
Hariri (10) Patent No.: US 12,113,810 B2
(45) Date of Patent: Oct. 8, 2024

(54) AUTONOMIC INCIDENT RESPONSE SYSTEM

(71) Applicant: 802 Secure, Inc., Pleasanton, CA (US)

(72) Inventor: Salim Hariri, Tucson, AZ (US)

(73) Assignee: 802 Secure, Inc., Pleasanton, CA (US)

( * ) Notice: Subject to any disclaimer, the term of this patent is extended or adjusted under 35 U.S.C. 154(b) by 254 days.

(21) Appl. No.: 17/394,214

(22) Filed: Aug. 4, 2021

(65) Prior Publication Data

US 2021/0367958 A1 Nov. 25, 2021

(51) Int. Cl.
*H04L 9/40* (2022.01)
*H04L 41/22* (2022.01)

(52) U.S. Cl.
CPC .......... *H04L 63/1416* (2013.01); *H04L 41/22* (2013.01); *H04L 63/1425* (2013.01); *H04L 63/1466* (2013.01)

(58) Field of Classification Search
None
See application file for complete search history.

(56) References Cited

U.S. PATENT DOCUMENTS

| | | | |
|---|---|---|---|
| 11,057,409 B1* | 7/2021 | Bisht | H04L 43/04 |
| 2016/0119365 A1* | 4/2016 | Barel | G06F 16/95 |
| | | | 726/12 |
| 2019/0259033 A1* | 8/2019 | Reddy | G06N 5/02 |
| 2020/0128047 A1* | 4/2020 | Biswas | H04L 67/10 |
| 2020/0296137 A1* | 9/2020 | Crabtree | H04L 63/1433 |

\* cited by examiner

*Primary Examiner* — Brandon Hoffman
(74) *Attorney, Agent, or Firm* — Womble Bond Dickinson (US) LLP (57) ABSTRACT

An autonomic incident response system (AIRS) that can be used within any cyber system (computing systems, network devices, applications, cyber-physical systems, data, and files). If a cyber system is attacked, the cyberattack pattern type can be seamlessly identified by the AIRS along with the method used to launch the attack, the vulnerability that was exploited, the impact and consequence of the attack, and finally the recovery actions that can be taken automatically or semi-automatically to stop the attack or mitigate its impact on cyber system operations.

19 Claims, 7 Drawing Sheets

APA

Target
- Network
  - Application
  - Transport,
  - Network
  - Mac
- Software
  - Operating System: Windows, Linux, Macs
  - Application
    - Server (Database, Email, Web
    - Client
- Hardware
  - Computer
  - Network Devices
  - Peripheral Devices
- User

Vulnerabilities
- Kernel Flaws
- Buffer Flaws
- Input Validation
  - Injection
    - Database injection
    - Cross-site Scripting (XSS)
    - Command Injection
- Authentication Error
  - Cross Site Forgery
  - Invalidated referrals
  - Access Level Control
- Misconfiguration
  - Default settings (username and passwords)
  - Unused entities
  - Weak protection of files/directories
- Social Engineering
- Weak Physical Protection
- File Descriptor Exploitation

Method
- Race Conditions
- Denial of Service
  - Network based flooding
  - Host based
- Password Attack
  - Guessing
    - Brute Force
    - Dictionary
  - Exploiting Implementation
- Network Attack
  - Web Compromise
    - Database
    - Cross-site scripting
    - Parameter manipulation
    - Cookie poisoning
    - Hidden field manipulation
  - Spoofing
  - Session Hijacking
  - Wireless Attack
- Misuse of Resources
  - API Abuse
  - Protocol Exploitation
- Installed Malware
  - Virus
  - Worms
  - Trojans
  - Spyware

Counter Measure
- Make it harder for attacker to succeed
- Attack Avoidance
- Harden Design
- Harden Implementation
- Harden Configuration

Consequence
- Resource Consumption
- Gain Privileges
- Information Disclosure
- Modification

AUTONOMIC INCIDENT RESPONSE SYSTEM

FIELD OF INVENTION

The present invention relates to cyber security monitoring and analysis, and more particularly, the present invention relates to machine learning based autonomous protection for cyber systems, distributed computing environments, Internet of Things applications, Cloud systems, and cyber-physical systems against known and new cyber-attacks.

BACKGROUND

In the last decade, the complexity, heterogeneity and the dynamism of cyber systems have increased considerably, making most of the current cybersecurity techniques ineffective in detecting, preventing from, or avoiding attacks. The known cyber defense systems are signature based, topology dependent, and manually intensive in their reactions. This makes them slow and ineffective in detecting or protecting from cyberattacks in distributed computing environments, Internet of Things (IoT), Cloud Computing, and Industrial Control Systems.

Current cyberattack detection techniques can be classified into signature-based and anomaly-based detection. Signature-based detection techniques are reactive approaches and cannot detect new or a variation of known attacks. Anomaly-based systems rely on training data representing normal behavior profiles in order to detect activity that is "outside the norm." While these systems are good at detecting new exploits, they suffer from high false positives. Whilst such tools are usually best-practice approaches, they are necessary but not sufficient in averting sophisticated and well-coordinated cyber-attacks, particularly those perpetrated by insiders and targeting applications; making administrators' best practices insufficient to prevent attacks on applications.

Also, the current intrusion detection systems (IDSs) suffer from two main limitations: (i) they are developed in ad hoc and for certain types of domains and/or environments; and (ii) they are labor intensive and difficult to control and manage. Signature-based IDSs are initialized with a set of signatures and require continuous updates as new signatures appear. Usually updating the signature set requires stopping the sensors, updating the signature set, and then restarting them. Few IDS tools provide mechanisms to enable/disable selected available signatures, but few others allow for dynamic upload to new signatures. Furthermore, the configuration of IDSs and their policies is labor intensive and static (cannot be changed dynamically). This makes the control and management of IDS in large networked systems that deploy several heterogeneous IDS systems both challenging and error prone. The cyber system administrators manually must use plethora of tools, policies, firewalls, and passwords to address the following challenges: 1) They need to handle millions of threat alerts daily, and 2) Their ability to handle these alerts in a timely manner by manually analyzing the analysis results produced by a wide range of cyber security tools, Security Information and Event Management (SIEM) tools to figure out the cyber-attack target, impact and how to respond to it. The manual administration makes the known system slow to respond to new threats and often ineffective.

Thus, a need is appreciated for an automated system and method that can overcome the aforesaid drawbacks of known intrusion detection systems.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to providing an autonomic incident response to detected attacks and shows the current state, the root cause of the detected attacks, and explain the effectiveness of the suggested responses.

It is another object of the present invention to have an intelligent (autonomic) incident response system that can identify a cyber attacker's plan, techniques and the tools being used to implement their attacks.

It is yet another object of the present invention to have the capability to deliver automated defensive responses to stop cyberattacks.

In one aspect, disclosed is an autonomic incident response system that uses innovative data structures (Alert Footprint), statistical time-series based Attack Pattern classification (STS-APC) to identify the type of attack pattern. Attack Pattern Attributes can be used to gain insights to identify type of attack, method used to launch attack, and what actions to be taken to stop or mitigate the impact of detected attack.

These and other objects and advantages of the embodiments herein and the summary will become readily apparent from the following detailed description taken in conjunction with the accompanying drawings.

BRIEF DESCRIPTION OF DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
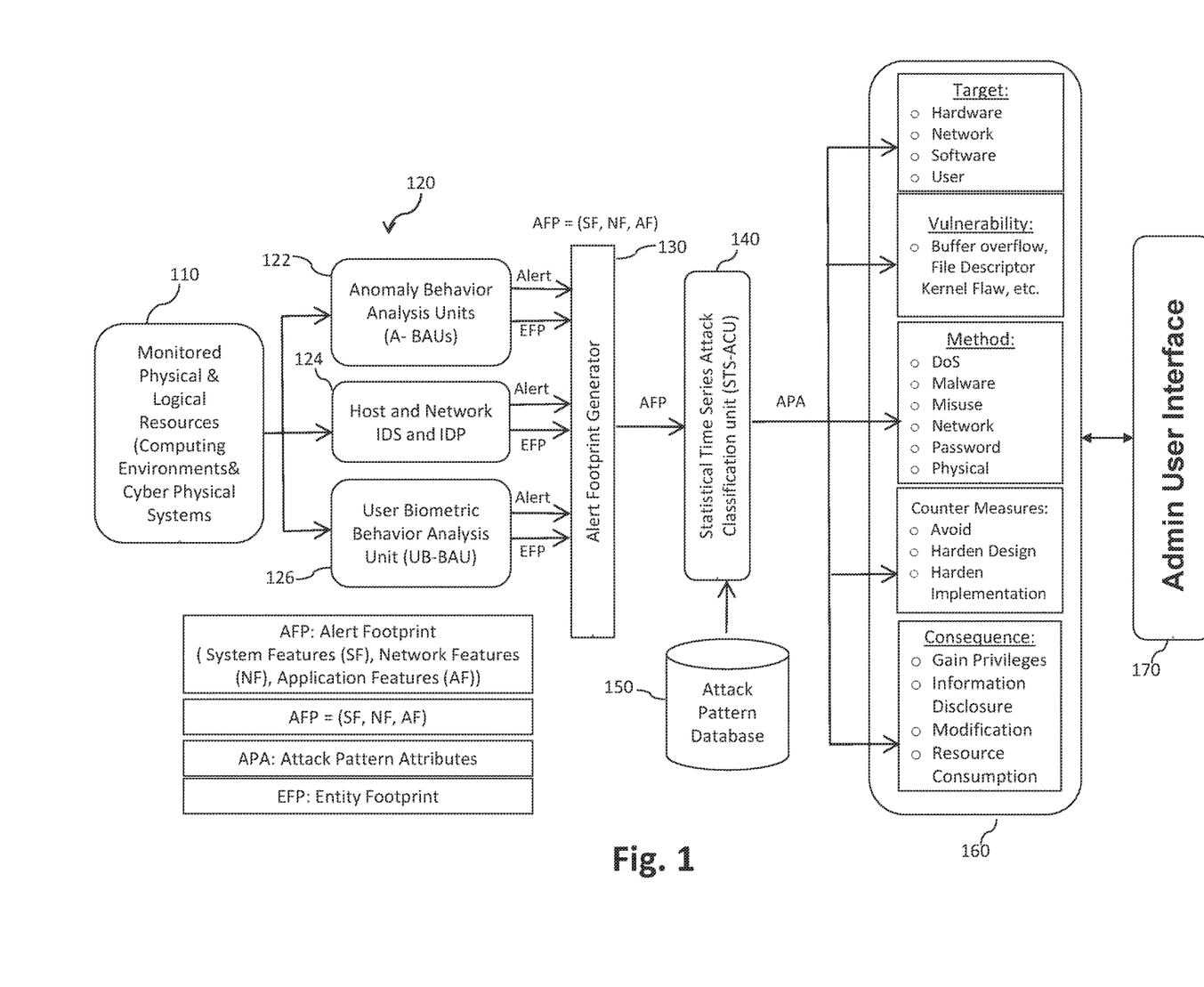
FIG. 1 is a block diagram showing the disclosed autonomic incident response system (AIRS), according to an exemplary embodiment of the present invention.

Referring to FIG. 1 which shows an exemplary embodiment of the disclosed autonomic incidence response system and a method to detect anomalous events and autonomically (seamlessly) respond to them in a timely manner with little manual work by the system administrator and cybersecurity analysts. First, information about the current states of the monitored network, computer, storage devices as well as the applications running on the computer devices can be collected, at block 110. Wide variety of monitoring software tools are available that can be used to collect measurements such as Security Information and Event Management (SIEM) tools. Any such tool is within the scope of the present invention. The SIEM tool can continuously monitor the resources and collect information about the behavior of managed resources. The SIEM tools can collect thousands of features and most of the features may not be relevant to the disclosed autonomic incidence response system. Such features can be preprocessed to obtain Entity Footprint (EFP) features. Following steps may be employed for preprocessing the data obtained from SIEM tools:

Removing the features which have constant integer values throughout the training samples for all the computers/ users because they do not provide information that allows a machine learning model to classify target.

For the cases when there are empty data (in case the monitoring tool was not able to capture any information for the application), applying computation method to replace the missing data with statistical estimates of the missing values. Such computation methods are discussed in Kang, Hyun, "*The prevention and handling of the missing data*" Korean journal of anesthesiology 64, no. 5 (2013): 402. In one case, mean computation can be used to replace all missing values within a variable by the mean of that feature in the training set.

Removing duplicated features that may lead to significant reduction in data dimensionality and therefore make machine learning models more easily interpretable.

Appling correlation analysis as disclosed in Hall, Mark Andrew "*Correlation-based feature selection for machine learning*" (1999), to eliminate the features that are strongly correlated to other features.

The Entity Footprint (EFP) features obtained by preprocessing of the features obtained from SIEM tools can be divided into three parts: System Features (SF), Network Features (NF) and Application Features (AF). An exemplary embodiment of the Entity Footprint (EFP) features is shown in FIG. 2.

Figure 2:
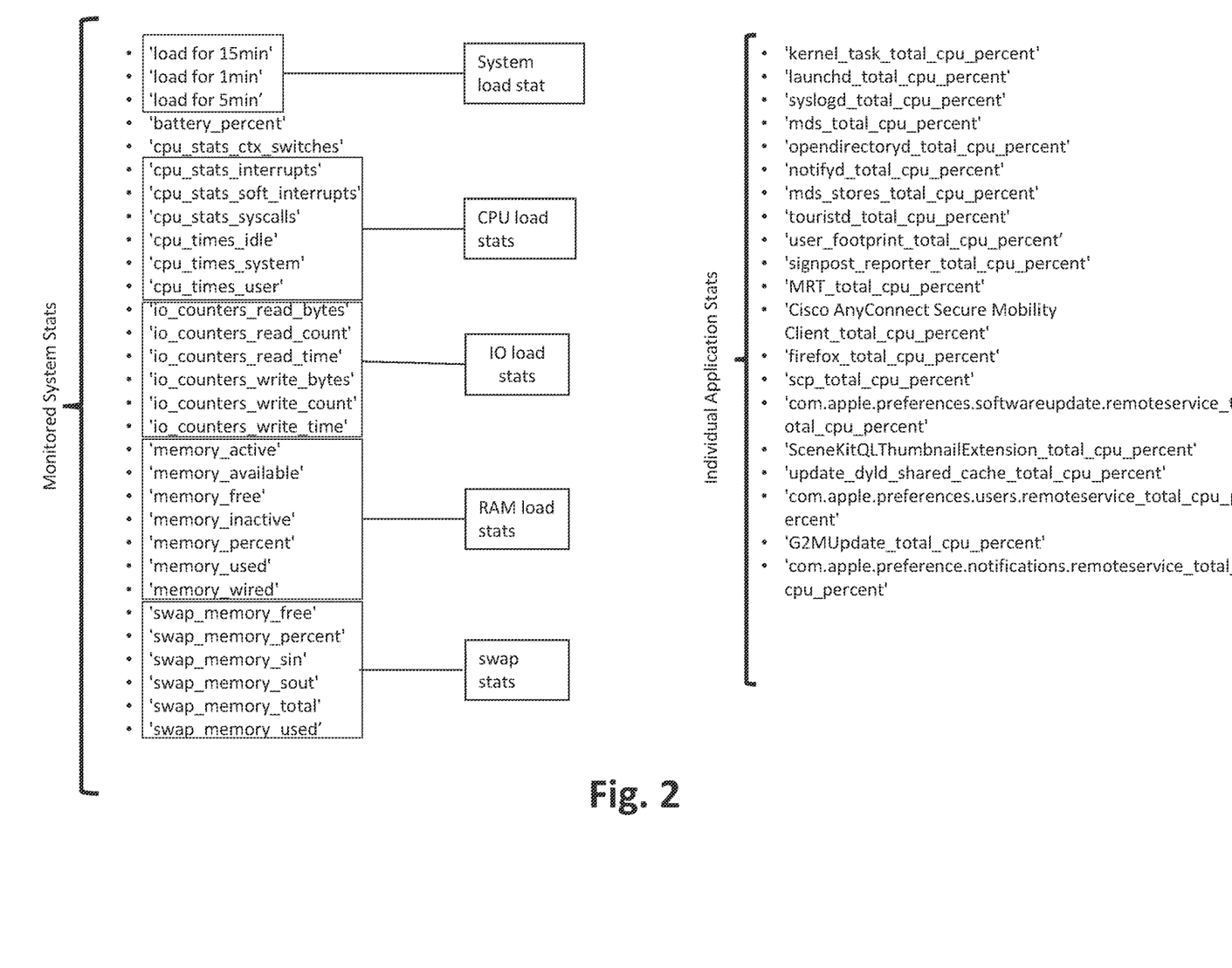
FIG. 2 shows an exemplary embodiment of the entity footprint (EFP) features that can be used to accurately characterize the normal operations of any cyber component (physical or logical), according to an exemplary embodiment of the present invention.

The Entity Footprint (EFP) features as shown in FIG. 2 can be further processed by an alert footprint generator to obtain the Alert Footprint (AFP) data that can be used by the Statistical Time-Series (STS) Attack Classification Unit (STS-ACU) as shown in FIG. 1. The alert footprint generator can select the numerical features that are numeric and have variations. Thereafter, Principal Component Analysis (PCA) can be applied to select the features that had the largest component values in the transformation matrix that transforms the scaled x-values (features) to the first N PCA components. The following code snippet shows the algorithm:

```
pca=PCA(n_components=n_components)
pca.fit(x_scaled)
trans_matr=pca.transform(np.eye(x_scaled.shape[1]))
top_parameters=np.unique(np.argmax(np.abs(trans_
   matr), axis=0))
```

Referring again to FIG. 1, the collected information at block 110, can be then fed into three types of security analysis tools Anomaly Behavior Analysis Units (A-BAUs) 122, Host and Network signature-based IDS/IPS tools 124, and User Biometric Behavior Analysis Units (UB-BAU) 126, at block 120. The Anomaly Behavior Analysis Units (A-BAUs) that use anomaly behavior analysis strategy to detect malicious events triggered by attacks, malicious faults, or accidents. Host and Network signature-based IDS/ IPS tools 124 use signature-based approach for detection and protection against cyber-attacks. The User Biometric Behavior Analysis Units (UB-BAU) 126 uses biometrics such as keyboard and mouse usage pattern to detect malicious events triggered by insiders. In case any threat is detected by any of the above three tools, the one or more of the cyber security tools can generate an alert. The details related to the alert including the data pre-processing analysis can be sent as a summary file, referred herein as the Entity Footprint (EFP) data. FIG. 1 shows how each of the above three tools can send an alert and the corresponding EFP data (shown by arrows).

Figure 3:
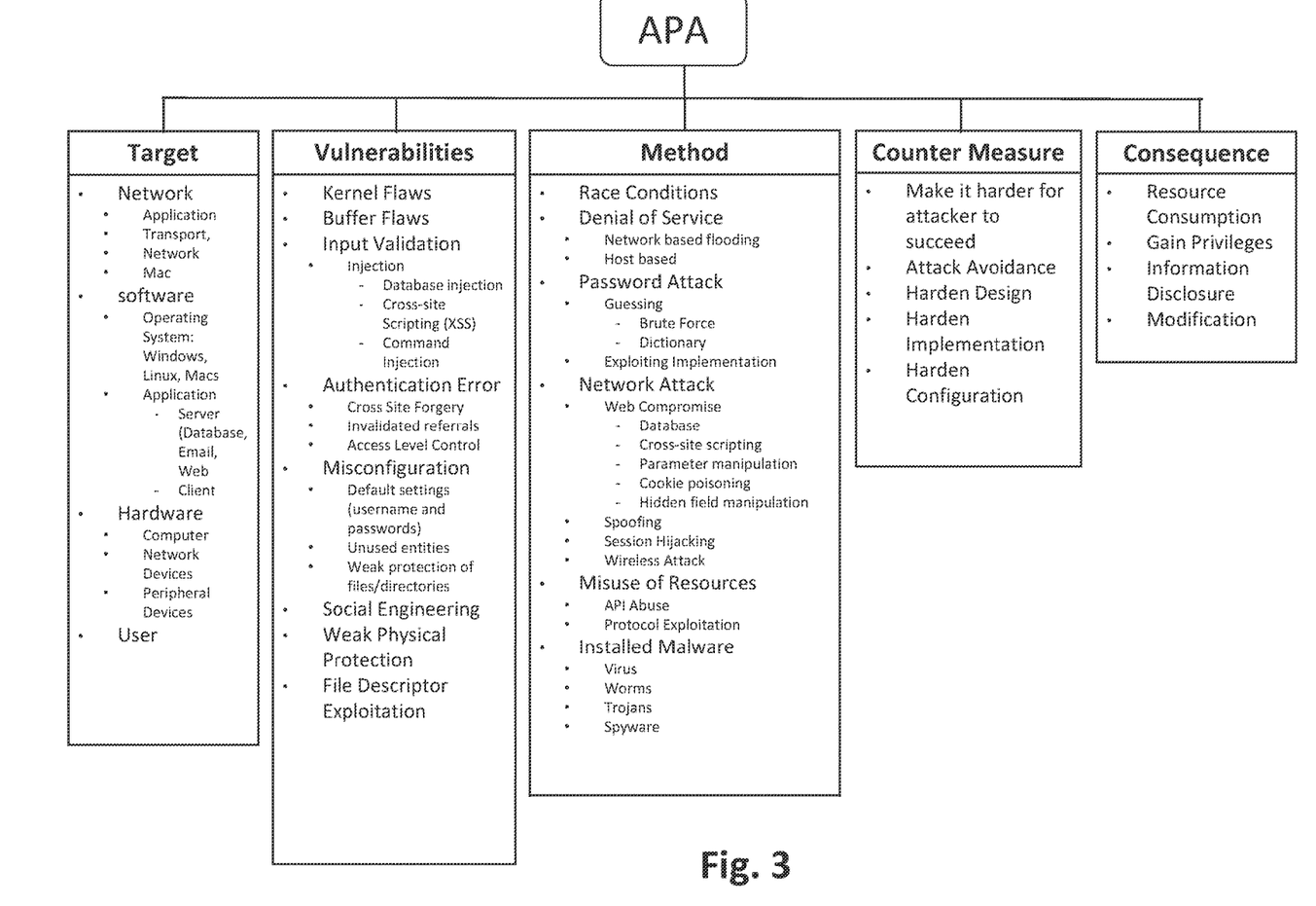
FIG. 3 shows an exemplary embodiment of the Attack Pattern Attributes (APA) that provides detailed information about the detected attack and the recommended responses to stop the attack and/or mitigate its impact, according to an exemplary embodiment of the present invention.
Figure 4:
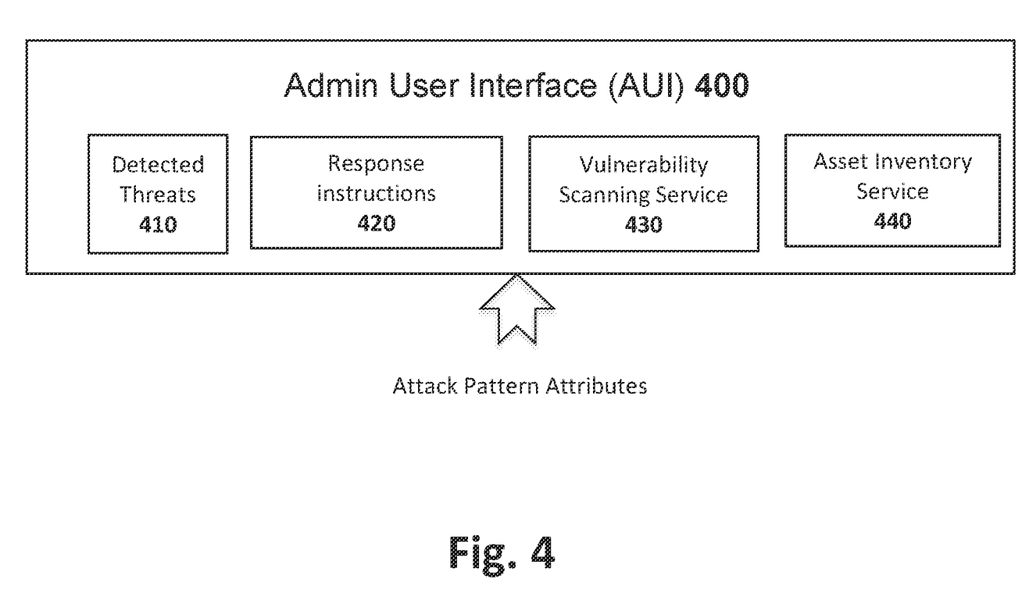
FIG. 4 shows an exemplary embodiment of the admin user interface, according to an exemplary embodiment of the present invention.

The EFP data can be received by the Attack Footprint (AFP) generator 130. The AFP generator can use the EFP data collected by the SIEM monitoring tools to generate the Attack Footprint (AFP) data that is associated with the detected attack or alert. The AFP data can then be fed to the Statistical Time-Series Attack Classification Unit (STS-ACU) unit 140, that can predict the Attack Pattern (AP) that best matches the AFP associated with the detected attack. The STS-ACU module 140 uses statistical time-series analysis techniques disclosed in this invention and Attack Pattern Dictionary (APD) 150 to predict the attack pattern (AP) type and attack pattern attributes (APA) 160 that provide further details about the detected attacks: Target—Hardware, Network, Software, User; Vulnerability—Buffer Overflow, File Descriptor, Incorrect Permission, Kernel Flaws, etc.; Method—Denial of Service (DoS), Malware, MisUse, Network, Password, Physical; Counter Measure—Avoid, Harden-Configuration, Harden-Design, Harden-Implementation, etc.; and Consequence—Gain Privileges, Information Disclosure, Un-authorized Modification, Resource Consumption. FIG. 3 shows an exemplary embodiment of the attack pattern attributes that can be accessible through the admin user interface 170. An exemplary embodiment of the admin user interface is shown in FIG. 4.

The disclosed innovative data-driven and intelligent autonomic incident response system (AIRS) can overcome the current security and forensic deficiencies of cyberspace resources and their applications. The disclosed AIRS provides the following innovative capabilities: (i) Surveillance and continuous Entity Footprint (EFP) data collection for behaviors of computers, networks, users, data access patterns, and applications; (ii) Innovative statistical and time-series analysis of Alert FootPrint (AFP) to achieve timely Attack Pattern (AP) identification and its attributes once an alert is generated by the cyber security tools (IDS/IPS, SIEM, Vulnerability Scanner, and Anomaly Behavior Analysis Units); and (iv) Automated and semi-automated responses to detected cyberattacks without impacting the overall normal operations and performance.

Continuous Entity Footprint (EFP) Data Collection Agents

Figure 5:
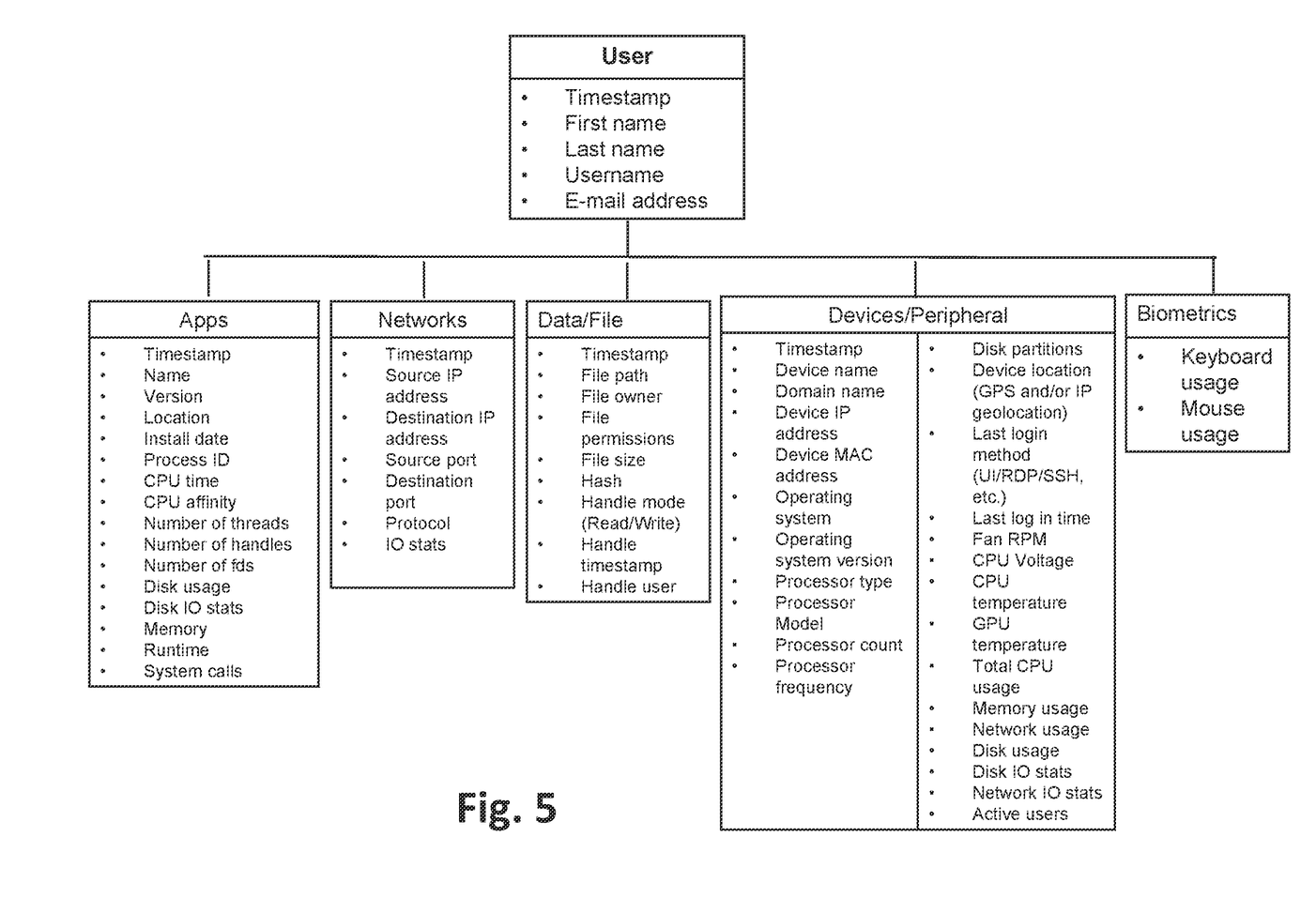
FIG. 5. shows the data collected by the SIEM tools, according to an exemplary embodiment of the present invention.

In the development of the EFP data structure that is associated with each cyber component or resource, a wide range of monitoring software tools, and Security and Information Event Management (SIEM) tools can be used to provide continuous status information about current operational states of these resources that will include network traffic as well as software systems operations, software tools, user activities, local, and remote applications as shown in FIG. 5. The existing network monitoring tools as well as system monitoring tools (e.g., system monitor, top, vmstat, iostat, etc.) can also be used to collect forensic information about software systems and their usage patterns of memory, CPUs, and I/Os. The next step is to be smart in selecting the features to be stored and analyzed. The goal of the feature selection technique is to select the minimum set of features that can accurately characterize the normal operations of cyber resources and can also be used in root-cause analysis.

In implementing EFP, a Monitoring Agent (MA) can run on each computing system to collect the required information. The MA classifies the information described in EFP into three types: System Features (SF), Network Features (NF) and Application Features (AF). These EFP data structures can then be further processed by AFP generator to obtain AFP and the AFP can then be used by the data-driven statistical and time-series analysis method to identify the attack pattern type and Attach Pattern Attributes (APA) which provide further information about the type of attack, the attacker goals, tools, and techniques used to instigate the attacks. The attack pattern attributes can help to determine suitable responses to the detected attack. Such response instructions can also be determined by the disclosed STS-Attack Classification Unit (STS-ACU) and these responses will be presented on the admin interface. The disclosed system can also itself take necessary steps to avert the attack in near real time.

In one embodiment, Attack Pattern Attributes (APA) can help system administrator and cyber security analysts learn all what he/she needs to know about the detected attack once its pattern is identified by the disclosed system. As shown in FIG. 3, the APA includes target: describes a specific type of attacks that commonly launched against cyber resources and applications; Vulnerability: describes the critical features that are exploited by attackers; Method: describes how a type of attack is executed; Counteract Measures: describes the best defense actions to counteract the detected attack; and Consequence: describes the impacts and the gain that can be obtained by a successful attack.

The disclosed autonomic incident response system uses the Entity Footprint (EFP) associated with generated alerts to produce the Attack Footprint (AFP) as shown in FIG. 1 that highlights the system, network, and application features used by the attack pattern classification models to identify the attack pattern and attack pattern attributes. In this effort, a new innovative approach based on statistical time-series analysis will be disclosed to classify the attack pattern that corresponds to the observed EFP features associated with the generated alerts. This allows for a more precise and better-learned model for attack pattern classification.

Once the attack pattern is identified by the disclosed STS-Attack Classification Unit (STS-ACU) model, all the details needed to understand the detected attack and how to respond to it are shown in FIG. 3. These details can be presented to the system administrator and cyber security analysts as shown in FIG. 4. Chiefly, the attack pattern attributes can include Target-Hardware, Network, Software, User; Vulnerability—Buffer Overflow, File Descriptor, Incorrect Permission, Kernel Flaws, etc.; Method—Denial of Service (DoS), Malware, MisUse, Network, Password, Physical; Counter Measure—Avoid, Harden-Configuration, Harden-Design, Harden-Implementation, etc.; and Consequence—Gain Privileges, Information Disclosure, Unauthorized-Modification, Resource Consumption.

Admin User Interface (AUI)

Once an Attack Pattern (AP) type is identified, the AP attributes (APA) can be identified (target, method, vulnerability, consequence, and counter measure), and then the AUI 400 can recommend the appropriate recovery actions. This process can reduce the investigation time of detected anomalous events and can also provide shorter response times to stop and/or prevent rapid propagation of complex attack strategies. The AUI 400 can provide the following capabilities:

Detected Threats 410

Detected threats show the attack pattern footprint data structures associated with the detected cyber-attacks with respect to system features, network features and application features.

Response Instructions 420

Based on the identified attack pattern (AP), all the recommended responses that can be used to counter measure the detected attacks. These responses can be configured to be launched automatically or semi-automatically based on the severity of the detected threats.

Vulnerability Scanning Service 430

Periodically analyze the cyber resources (logical and physical) to identify any existing vulnerabilities and refer to the Response Instructions to take the appropriate actions to fix the detected vulnerabilities.

Asset Inventory Service 440

Identifies all the physical and logical resources that are connected to the cyber system and flag the ones that are not authorized to be connected to the system.

One Line Adaptive Learning Framework

It is critically important that the method used to identify attack pattern to be updated dynamically to model accurately the recent changes in cyber-attacks as well as the behavior of monitored resources, software, applications, and users. The recommended responses must take into consideration the current security and management policies of the organization in which the AIRS being deployed.

Statistical Time-Series-Based Attack Pattern Classification

Disclosed statistical time-series data-driven method can be used to identify accurately attack pattern and create Attack Pattern Attributes that can help system administrator and cyber security analysts learned all what they need to know about the detected attack once its pattern is identified as shown in FIG. 3. Statistical Time-Series (STS) that is disclosed in this invention is significantly different from manual intensive approach that is mostly used today to classify the type of detected attacks. The STS-based Attack Pattern (STS-AP) classification utilizes existing monitoring tools such as Security Information and Event (SIEM) tools to continuously monitor cyber resources (e.g., computers, network devices, storage systems, sensors and actuators, etc.) and their applications, and continuously analyze their behaviors by using statistic as well as time-series metrics in order to predict the attack type and consequently, its attributes and how to best to respond to the detected attack.

Figure 6:
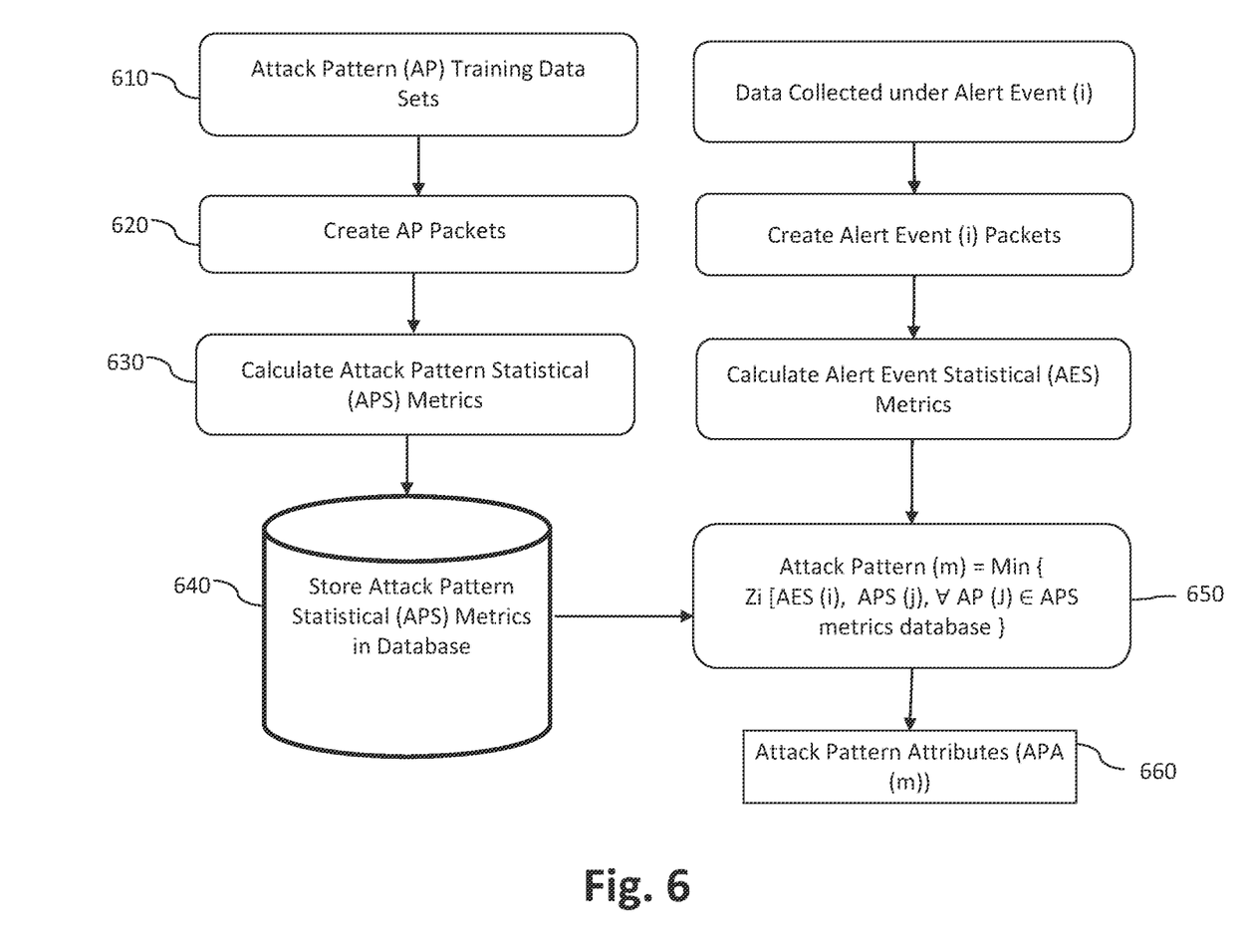
FIG. 6 shows steps in statistical time-series based attack classification module, according to an exemplary embodiment of the present invention.

FIG. 6 shows an overview of the disclosed STS-AP implementation methodology. In the first step 610, it is used to generate the attack pattern training data sets. In the second step 620, N consecutive samples observed during the attack execution phase are grouped into a data structure that is referred herein as a Packet. Then for each Packet, a set of statistics and time series metrics are used to accurately characterize the behavior of the attack with respect to the N consecutive samples, at step 630. The Attack Pattern Statistical (APS) metrics can be calculated for all the attacks that are used in the training phase and then it can be stored in the APS metrics database, at step 640. The APS metrics database can be used to determine the attack pattern, at step 650 and attack pattern attributes can be determined at step 660.

During the validation and/or testing of the STS-AP classification methodology shown on the right side of FIG. 6, the same statistical metrics can be calculated in a similar method to that were used during the training phase. The attack pattern corresponding to the analyzed alert is the one that has the minimum Z score with respect to the Alert Event Statistical (AES) metrics associated with Alert event (i). The calculation of Z score will be shown next.

Generate Packet Data Structure for Each Attack Pattern:

In order to perform the statistical time-series analysis, we need to know how the measured feature value behaves over a period of time. The time period can be determined based on the operational characteristics of each monitored resource that can be physical or logical one. Therefore, the statistical and time series metrics shall be calculated from a series of consecutive measured values that are grouped into Packets. In one case, a packet length of N (say, N=30) samples, with overlapping period of packets.

Packet Statistical Metrics associated with Each Attack Pattern (AP)

The following is a sample of the M metrics that can be used to characterize the statistics and temporal behavior of one packet of a measured feature.

A sample of the statistical features to be computed can be as below:

Mean: $\mu = E(X_i)$

Standard dev.: $\sigma = \sqrt{\frac{1}{N-1}\sum (X_i - \mu)^2}$

Skewness-*-s: $s = E\left[\left(\frac{X_i - \mu}{\sigma}\right)^3\right]$

Auto-covariance: $K(n) = E[(X_i - \mu)(X_{i+n} - \mu)]$

The Information theory-based metrics can be as below:

Rényi entropy: $H = \frac{\alpha}{1-\alpha}\log\left(\sum p_i^\alpha\right)$ where $\alpha=2$, and the p-values are obtained from a Scott-histogram of $X_i$.

The Signal processing-based metrics can be as below:

$$P = \sum_{f>f_{min}}^{f<f_{max}} |\phi_X(f)|^2$$

where $\phi$ denotes the Fast-Fourier transform of $X_i$.

Calculating Attack Pattern Statistics (APS) Metrics

For each feature, we calculate M metrics associated with each packet. For example, in the Windows computing system, the following seven features can be selected:

'HandleCount',
'IOOtherOperationsPersec',
'PageFileBytes',
'PageFileBytesPeak',
'PageFileUsage',
'Peak Virtual Size',
'PeakWorkingSetSize'.

Calculating Attack Classification Score (ACS)

For each alert, we compare its Alert Event Statistical (AES) metrics with those stored in the APS metrics database at step 650 in FIG. 6 using the z-score metric that can be computed as below:

$$Z_n = \left(\frac{\sum_i y_{n,i}}{N} - \mu_n\right)/\sigma_n$$

where $y_{n,i}$ are the values of the n-th metric, and the summation goes for the values in the packet, while $\mu_n$ and $\sigma_n$ are the respective 'normal' values. The calculated statistical values are the mean ($\mu=E(X_i)$) and the standard deviation $$\left(\sigma = \sqrt{\frac{1}{N-1}\Sigma(X_i - \mu)^2}\right).$$

The calculated values were aggregated to obtain an Attack Classification Score (ACS) for each alert as a function of time. The aggregation is based on the root-mean-square (RMS) formula, so that the ACS of an Alert p can be calculated as below:

$$ACS_p = \sqrt{\sum_{1}^{140}(Z_n)^2}$$

where the summation includes all the 20 metrics for all 7 features, therefore it has 140 elements; in this example, we assume the number of metrics M=20, and number of features N=7 for the Window computer example.

Determining the Attack Pattern Associated with an Alert

The APS metrics that give the minimum $ACS_p$ value can be the attack pattern that behaves statistically and temporally in a similar manner to the detected alert event. This can be computed for an Alert Event p ($AE_p$) as:

Min $ACS_p$={Zp(AES, APS), ∀AP(J) ∈ APS metrics database}

Once the attack pattern can be identified, all the detailed attributes needed to understand the detected attack and how to respond to it can be known to system administrator and cyber security analysts. Below is a summary of the main attack pattern attributes:

Once an Attack Pattern (AP) type can be identified, the AP attributes can be identified (target, method, vulnerability, consequence, and counter measure) as shown in FIG. 3, and then the AUI recommends the appropriate recovery actions. This process will reduce the investigation time of detected anomalous events that is currently manual intensive and will also provide shorter response times to stop and/or prevent rapid propagation of complex attack strategies. In summary, AUI can provide the following capabilities:

Detected Threats: It shows the attack pattern footprint data structures associated with the detected cyber-attacks with respect to system features, network features and application features.

Response Instructions. Based on the identified attack pattern, it can list all the recommended responses that can be used to counter measure the detected attacks. These responses can be configured to be launched automatically or semi-automatically based on the severity of the detected threats.

Vulnerability Scanning Service that periodically analyze the cyber resources (logical and physical) to identify any existing vulnerabilities and refer to the Response Instructions to take the appropriate actions to fix the detected vulnerabilities.

Inventory Service that identifies all the physical and logical resources that are connected to the cyber system and flag the ones that are not authorized to be connected to the system.

On Line Adaptive Learning Framework. It is critically important that the statistical-time series algorithms used to identify attack pattern to be updated dynamically to model accurately the recent changes in cyber-attacks as well as the behavior of monitored resources, software, applications and users.

The recommended responses must take into consideration the current security and management policies of the organization in which the AIRS being deployed.

Response Instructions: Machine learning and AI methods can be utilized to determine the appropriate actions to stop the detected attack and mitigate its impact.

EXAMPLE 1

DOS Attack Scenario 1

The AIRS is operating at a small company having a dozen nodes. The anomaly behavior analysis units monitor each node separately and detects an anomaly happening at the same time at two nodes: one is the PC of a developer, the other is the server providing 24/7 service to customers. An alert is generated along with the entity footprint (EFP) data associated with these computers. The Attack Footprint (AFP) generator will produce the Attack Pattern Attributes in terms of System Features (SF), Network Features (NF), and Application Features (AF). The AFP will then be used by the Statistical-Time Series Attack Classification Unit (STS-ACU) to identify the Attack Pattern and its attributes and prepares an information package with the hardware features of nodes. The STS-ACU will identify that the server is under a DDOS attack; the PC has a buffer-overflow as reported by the SF data. The Attack Attributes provide details information about the vulnerabilities exploited, methods used to launch the attack, severity of the attack and the recommended actions. As a result, the types of the two parallel incidents are identified, the affected nodes are identified, and the respective priority level is identified: the DDOS on the server has the highest priority. The response instructions are typically based on best practices and finds the standard response actions in the database. In this case, the source IP address used to launch the DDOS traffic will be blocked, and an immediate email was sent to the CIO of the organization as required by the organization's security policy.

EXAMPLE 2

Policy Violations Scenario 2

An employee has violated corporate policy, by accessing a classified system from a foreign country and has copied restricted data. The anomaly behavior analysis will detect this anomalous behavior of the user (significant gap between observed behavior and the expected normal behavior will trigger an alert. The EPF associated with the host storing the restricted data and in particular the Attack Footprint (AFP) will indicate that the user did connect to a classified device (System Features) from a foreign IP address (Network Features), and the data being accessed from the Application Features. Finally, biometric data confirms that it was in fact the user who performed this action and not an intruder. With the evidence provided by the AFP data structure, the attack pattern identified, and its attributes suggest that the outside network connection to the computer will be blocked immediately, user account will be frozen, and email message describing the attack attributes were sent to appropriate managers within the organization.

Figure 7:
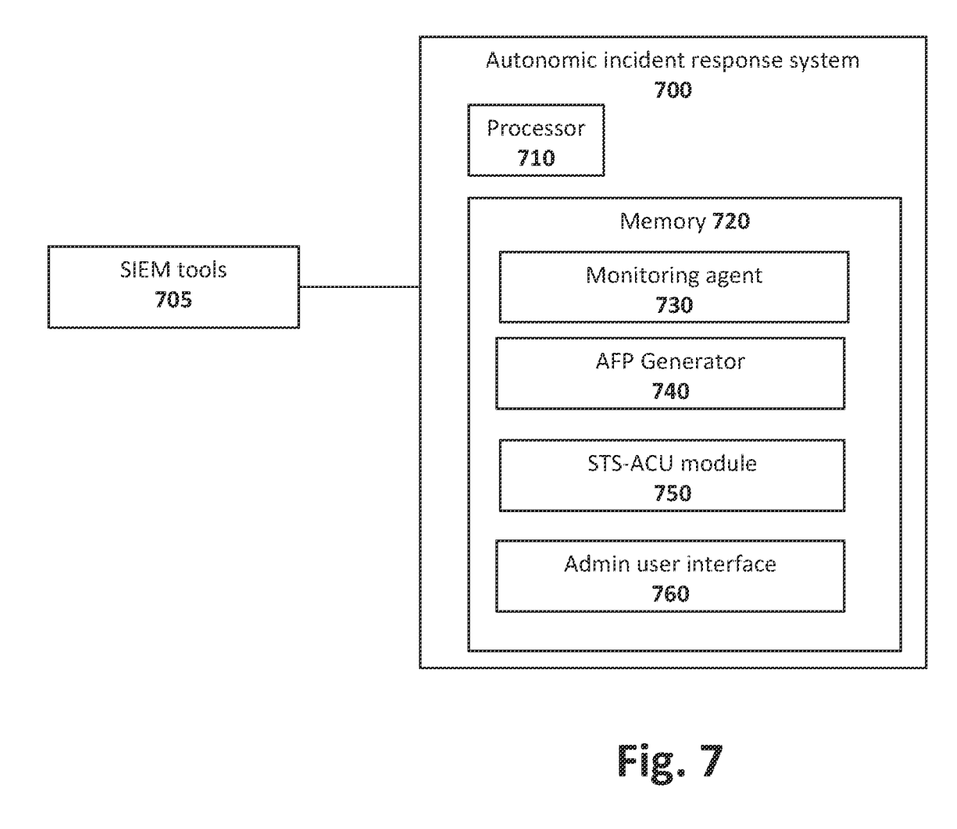
FIG. 7 is an environmental diagram showing the disclosed autonomic incidence response system communicating with SIEM tools, according to an exemplary embodiment of the present invention.

Referring to FIG. 7 which shows an exemplary embodiment of the autonomic incidence reporting system 700. The autonomic incidence reporting system 700 can include a processor 710 and a memory 720, wherein the processor 710 can be operably coupled to the memory 720. The memory 720 can include monitoring agent 730, AFP generator 740, STS-ACU module 750, and an admin user interface 760. The monitoring agent 730 upon execution by the processor 710 can receive system, network, and application features from SIEM tools 705 and pre-process the monitored features to obtain EFP features. The AFP generator 740 upon execution by the processor can process the EFP features to obtain AFP data. The AFP data can be the received by the STS-ACU module 750 to obtain the attack pattern and the attack pattern attributers. The admin user interface upon execution by the processor can present and execute response instructions for mitigating a cyberattack.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An autonomic incident detection and response system, comprising:
   at least one processor; and
   at least one memory coupled to the at least one processor to store instructions, which when executed by the at least one processor, cause the autonomic incident response system to perform operations, the operations comprising:
   receiving an alert indicating a detected cyber threat incident on a monitored resource;
   collecting information about an entity associated with the detected cyber threat incident;
   pre-processing the collected information to generate entity footprint data, the entity footprint data comprising at least one of: system features, network features, or application features of the entity associated with the detected cyber threat incident;
   obtaining attack footprint data based on the generated entity footprint data;
   classifying the attack footprint data using statistical time series analysis, to identify an attack pattern;
   invoking a machine learning model to determine at least one response instruction based on the identified attack pattern; and
   generating a counter measure based on the at least one response instruction.

2. The autonomic incident detection and response system of claim 1, wherein the operations further comprise:
   identifying attack pattern attributes based on the identified attack pattern; and
   applying the generated counter measure in response to the detected cyber threat incident.

3. The autonomic incident detection and response system of claim 1, wherein the alert indicating the detected cyber threat incident is generated based on at least one of: (i) a detection of a malicious event triggered by an attack, a malicious fault, or an accident, (ii) use of signature-based approach for detection against a cyber-attack, or (iii) use of biometrics to detect a malicious event triggered by an insider.

4. The autonomic incident detection and response system of claim 1, wherein obtaining the attack footprint data comprises:
   selecting numerical features from the entity footprint data, and
   applying a principal component analysis to the selected numerical features to obtain the attack footprint data.

5. The autonomic incident detection and response system of claim 1, wherein generating the counter measure comprises:
   automating the at least one response instruction to generate the counter measure.

6. The autonomic incident detection and response system of claim 2, wherein the identified attack pattern attributes and the at least one response instruction are presented through a user interface.

7. The autonomic incident detection and response system of claim 1, wherein classifying the attack footprint data using the statistical time series analysis comprises:
   calculating an attack classification score based on alert event statistical metrics of the attack footprint data and stored attack pattern statistical metrics, wherein the stored attack pattern statistical metrics are calculated based on attack patterns used in attack pattern training data sets.

8. The autonomic incident detection and response system of claim 7, wherein the operations further comprise:
   identifying the attack pattern based on the attack classification score.

9. A computer-implemented method for an autonomic incident detection and response system, the method comprising:
   receiving an alert indicating a detected cyber threat incident on a monitored resource;
   collecting information about an entity associated with the detected cyber threat incident;
   pre-processing the collected information to generate entity footprint data, the entity footprint data comprising at least one of: system features, network features, or application features of the entity associated with the detected cyber threat incident;
   obtaining attack footprint data based on the generated entity footprint data;
   classifying the attack footprint data using statistical time series analysis, to identify an attack pattern;
   invoking a machine learning model to determine at least one response instruction based on the identified attack pattern; and
   generating a counter measure based on the at least one response instruction.

10. The method of claim 9, further comprising:
    identifying attack pattern attributes based on the identified attack pattern; and
    applying the generated counter measure in response to the detected cyber threat incident.

11. The method of claim 9, wherein the alert indicating the detected cyber threat incident is generated based on at least one of: (i) a detection of a malicious event triggered by an attack, a malicious fault, or an accident, (ii) use of signature-based approach for detection against a cyber-attack, or (iii) use of biometrics to detect a malicious event triggered by an insider.

12. The method of claim 9, wherein obtaining the attack footprint data comprises:
    selecting numerical features from the entity footprint data, and
    applying a principal component analysis to the selected numerical features to obtain the attack footprint data.

13. The method of claim 9, wherein generating the counter measure comprises:
    automating the at least response instruction to generate the counter measure.

14. The method of claim 10, wherein the identified attack pattern attributes and the at least one response instruction are presented through a user interface.

15. The method of claim 9, wherein classifying the attack footprint data using the statistical time series analysis comprises:
    calculating an attack classification score based on alert event statistical metrics of the attack footprint data and stored attack pattern statistical metrics, wherein the stored attack pattern statistical metrics are calculated based on attack patterns used in attack pattern training data sets.

16. The method of claim 15, further comprising:
    identifying the attack pattern based on the attack classification score.

17. An autonomic incident detection and response system, comprising:
    at least one processor; and
    at least one memory coupled to the at least one processor to store instructions, which when executed by the at least one processor, cause the autonomic incident response system to perform operations, the operations comprising:
    collecting information about a monitored resource;
    segmenting the collected information into system features, network features, and application features;
    pre-processing at least one of: the system features, the network features, or the application features, to obtain entity footprint data; and
    generating an alert indicating a detected cyber threat incident on the monitored resource based on the entity footprint data;
    wherein:
    the alert indicating the detected cyber threat incident on the monitored resource is received;
    information about an entity associated with the detected cyber threat incident is collected;
    the collected information about the entity associated with the detected cyber threat incident is pre-processed to generate the entity footprint data, the entity footprint data comprising at least one of: system features, network features, or application features of the entity associated with the detected cyber threat incident;
    attack footprint data is obtained based on the generated entity footprint data;
    the attack footprint data is classified using statistical time series analysis, to identify an attack pattern;
    a machine learning model is invoked to determine at least one response instruction based on the identified attack pattern; and
    a counter measure is generated based on the at least one response instruction.

18. The autonomic incident detection and response system of claim 17, wherein generating the alert relating to the detected threat on the monitored resource comprises:
    generating the alert relating to the detected threat on the monitored resource in response to detecting from the collected information a malicious event triggered by an attack, a malicious fault, or an accident; or
    generating the alert relating to the detected threat on the monitored resource in response to detecting from the collected information a cyber-attack using a signature-based approach; or
    generating the alert relating to the detected threat on the monitored resource in response to detecting from the collected information a malicious event triggered by an insider using biometrics.

19. The autonomic incident detection and response system of claim 17, wherein pre-processing the system features, the network features, and the application features comprises:
    removing features having a constant integer value; or
    applying a correlation analysis to eliminate features having a correlation to other features; or
    removing duplicated features.

* * * * *